(12) United States Patent
Samie et al.

(10) Patent No.: US 8,499,912 B2
(45) Date of Patent: Aug. 6, 2013

(54) TORQUE CONVERTER WITH LOCK-UP CLUTCH

(75) Inventors: Farzad Samie, Franklin, MI (US); Andrew L. Bartos, Clarkston, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 12/968,339

(22) Filed: Dec. 15, 2010

(65) Prior Publication Data

US 2012/0152678 A1 Jun. 21, 2012

(51) Int. Cl.
*F16H 45/02* (2006.01)

(52) U.S. Cl.
USPC .......................................... 192/3.3; 192/55.61

(58) Field of Classification Search
USPC ................................ 192/3.3, 3.29, 213, 55.61
See application file for complete search history.

(56) References Cited

U.S. PATENT DOCUMENTS

| | | | | |
|---|---|---|---|---|
| 4,139,995 A | * | 2/1979 | Lamarche | 464/64.1 |
| 4,382,496 A | * | 5/1983 | Yamamori et al. | 192/3.29 |
| 5,823,516 A | * | 10/1998 | Despres | 267/168 |
| 5,964,328 A | * | 10/1999 | Fallu et al. | 192/3.29 |
| 7,225,908 B2 | * | 6/2007 | Back et al. | 192/3.3 |
| 7,815,026 B2 | * | 10/2010 | Povirk et al. | 192/3.26 |
| 2007/0295572 A1 | * | 12/2007 | Samie et al. | 192/3.3 |
| 2009/0035129 A1 | * | 2/2009 | Samie et al. | 415/191 |
| 2009/0088261 A1 | * | 4/2009 | Clark et al. | 464/68.1 |
| 2009/0157272 A1 | * | 6/2009 | Uhler et al. | 701/67 |
| 2009/0223767 A1 | * | 9/2009 | Arhab et al. | 192/3.29 |
| 2010/0126816 A1 | * | 5/2010 | Takei et al. | 192/3.29 |

\* cited by examiner

*Primary Examiner* — Rodney Bonck
*Assistant Examiner* — Lillian Nguyen
(74) *Attorney, Agent, or Firm* — Quinn Law Group, PLLC

(57) ABSTRACT

A torque converter for an automatic transmission includes a first fluid flow path for supplying a fluid to a pump cavity, a second fluid flow path for removing the fluid from the pump cavity, and a third fluid flow path for supplying a hydraulic signal to a lock-up clutch. The third fluid flow path is separate and distinct from the first fluid flow path and the second fluid flow path. A sleeve divides a stepped axial bore in the turbine output shaft into an inner stepped axial bore cavity, which is part of the third fluid flow path, and an outer stepped axial bore cavity, which is part of the first fluid flow path. The torque converter further includes an isolator assembly having a twenty degree rotational travel dampening distance.

14 Claims, 2 Drawing Sheets

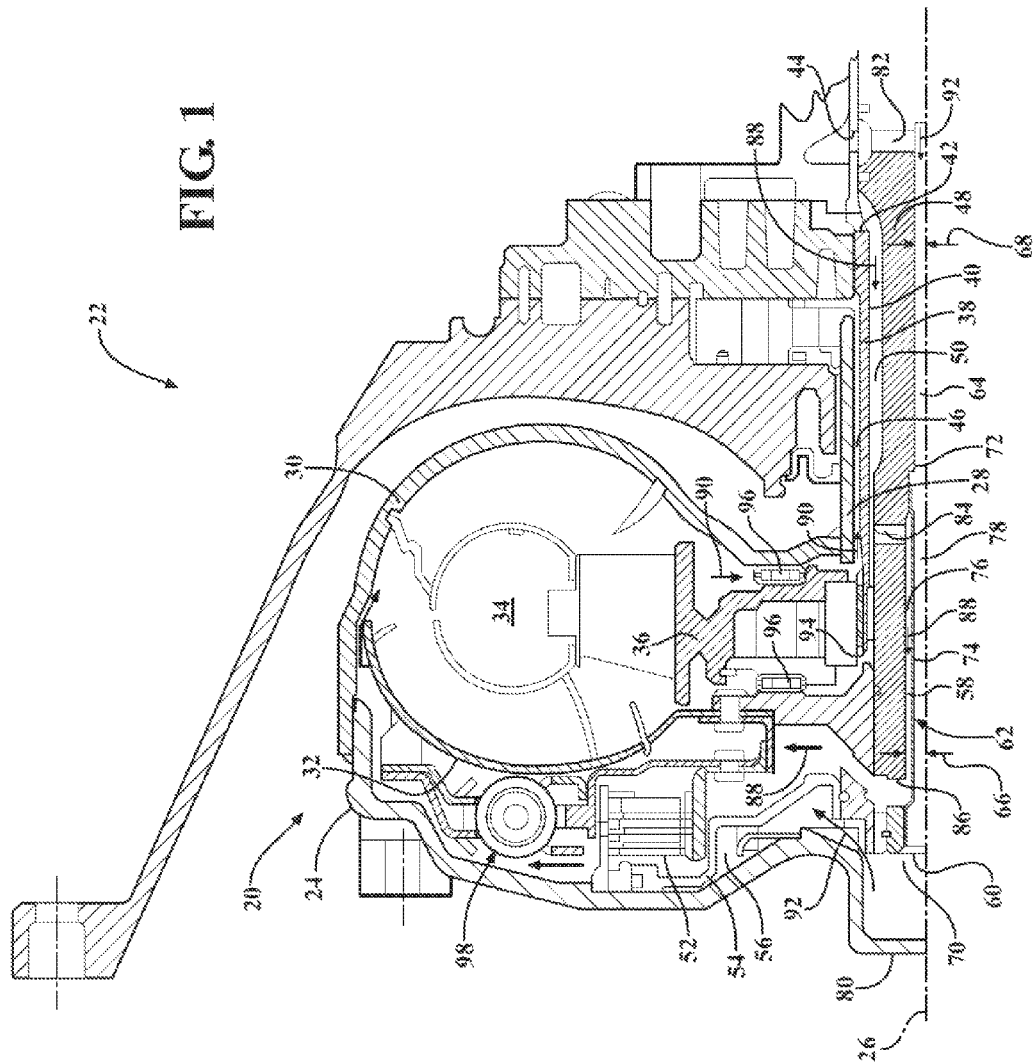

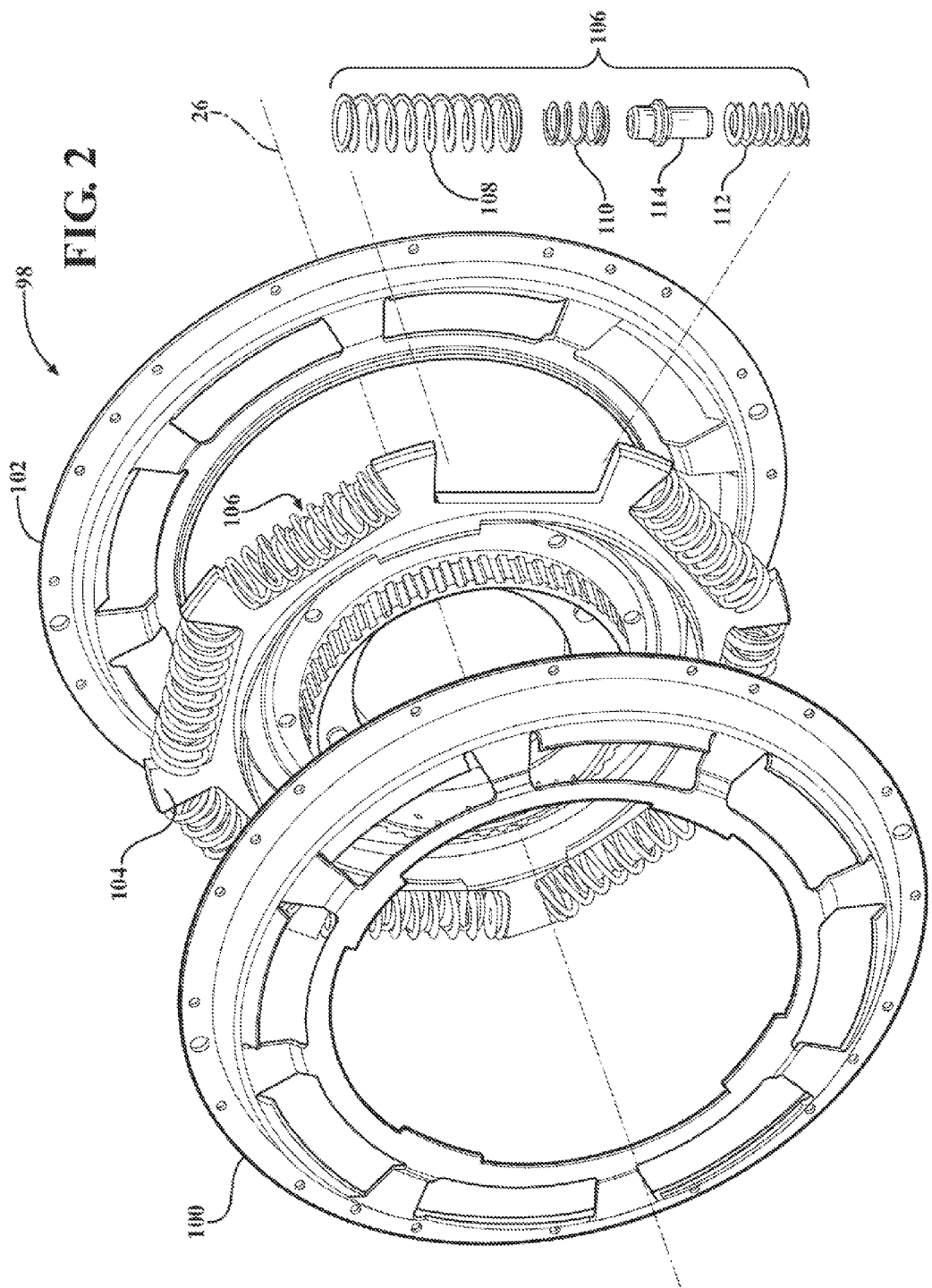

TORQUE CONVERTER WITH LOCK-UP CLUTCH

TECHNICAL FIELD

The invention generally relates to a torque converter for an automatic transmission, and more specifically, to a torque converter with a lock-up clutch.

BACKGROUND

Automobiles with automatic transmissions are typically equipped with a fluid coupling device, i.e., a torque converter, between the engine and the transmission. The torque converter transfers torque from the engine to the transmission. The torque converter allows the load from the engine to slip at lower engine operating speeds, such as when the engine is at idle, thereby preventing the engine from stalling. When the engine is operating at higher speeds, the torque converter transfers the torque from the engine to the transmission with little slippage.

A common internal feature of the modern torque converter is an electronically controlled converter clutch, hereinafter referred to as a lock-up clutch. When fully engaged after a predetermined engine load, vehicle speed, and transmission gear ratio is achieved, the lock-up clutch mechanically connects the engine crankshaft to the transmission input shaft, thereby eliminating the speed differential, or slip, inherent to torque converter operation. The result is improved fuel efficiency.

To minimize the transfer of firing pulses from the engine into the transmission when the lock-up clutch is fully engaged, a spring damper is commonly provided in the torque path within the torque converter housing. However, the damping efficiency of spring dampers is typically not uniform across the full vehicle driving range. When operating within ranges of damper inefficiency, such as lower vehicle speeds, it may be desirable to introduce a controlled amount of slip across the lock-up clutch to help reduce the transfer of engine firing pulses into the transmission.

Conventional torque converters including the lock-up clutch are typically provided with two oil flow paths, an apply passage and a release passage. Because the oil in the torque converter is performing work during periods of slip operation, as when the lock-up clutch is disengaged or operating in a controlled slip condition, heat is generated in the oil that must be dissipated. Consequently, the apply and release passages also double as a flow path for circulating cooling oil into and out of the torque converter. Oil exiting the torque converter is typically directed to a heat exchanger where the excess heat is removed.

To apply the lock-up clutch, hydraulic oil is directed into the apply passage, which exerts a hydraulic force on a piston or disk within the torque converter. The piston engages the lock-up clutch and forces it into contact with a reaction member. The reaction member is typically, but not necessarily, a portion of the torque converter housing. Because a portion of the cooling oil flow path is through the gap between the lock-up clutch and the reaction member, this operating mode substantially blocks the flow path through the torque converter, thereby negatively affecting the flow of cooling oil through the torque converter.

To disengage the lock-up clutch, the direction of oil flow is reversed, i.e., the hydraulic oil is directed into the release passage. The hydraulic force acts on the piston in the opposite direction, moving the lock-up clutch away from the reaction member, thereby disengaging it. This mode of operation unblocks the flow path so that the flow of cooling oil may then be restored.

A dedicated spool valve is required to control and/or change the direction of flow into the apply passage or the release passage, to engage and/or disengage the lock-up clutch.

In a torque converter with two oil flow paths as described above, accurately controlling the amount of slip across the lock-up clutch, while simultaneously maintaining a flow of cooling oil into and out of the torque converter, is difficult to accomplish.

SUMMARY

A torque converter for an automatic transmission is provided. The torque converter includes a housing rotatable about and concentric with a central axis. A pump is attached to the housing for rotation with the housing about the central axis. A turbine is concentric with and opposes the pump to define a pump cavity between the turbine and the pump. The turbine is rotatable about the central axis. The turbine includes a turbine output shaft defining a stepped axial bore. The stepped axial bore includes a first portion at a first diameter and a second portion at a second diameter. A sleeve is disposed within the first portion of the stepped axial bore. The sleeve includes a sleeve diameter substantially equal to the second diameter of the second portion of the stepped axial bore. The sleeve divides the first portion of the stepped axial bore to define an outer stepped axial bore cavity and an inner stepped axial bore cavity. A lock-up clutch selectively interconnects the turbine and the housing. The lock-up clutch is actuated by a variable hydraulic signal between an engaged position and a disengaged position. When in the engaged position, the lock-up clutch couples the turbine to the housing for rotation with the housing about the central axis. When in the disengaged position, the lock-up clutch decouples the turbine and the housing to allow independent rotation of the turbine relative to the housing. A first fluid flow path is configured to supply a fluid to the pump cavity. The first fluid flow path includes the outer stepped axial bore cavity. A second fluid flow path is configured to remove the fluid from the pump cavity. A third fluid flow path, which is independent and distinct from the first fluid flow path and the second fluid flow path, is configured to supply the variable hydraulic signal to the lock-up clutch to move the lock-up clutch between the engaged position and the disengaged position. The third fluid flow path includes the inner stepped axial bore cavity.

An isolator assembly for an automatic transmission is also provided. The isolator assembly includes a first cover and a second cover. The second cover is concentric with the first cover about a central axis. A damper support plate is disposed between and supported by the first cover and the second cover. A plurality of spring assemblies is supported by the damper support plate. Each of the plurality of spring assemblies is radially spaced about and equidistant from the central axis. The first cover and the second cover are rotatable about the central axis relative to the damper support plate a rotational dampening travel distance equal to approximately twenty degrees)(20°) about the central axis.

A torque converter for an automatic transmission is also provided. The torque converter includes a housing rotatably about and concentric with a central axis. A pump is attached to the housing for rotation with the housing about the central axis. A turbine is concentric with and opposes the pump to define a pump cavity between the turbine and the pump. The turbine is rotatable about the central axis. The turbine includes a turbine output shaft that defines a stepped axial bore. The stepped axial bore includes a first portion at a first diameter and a second portion at a second diameter. The second portion is concentric with the first portion. The second diameter of the second portion of the stepped axial bore is smaller than the first diameter of the first portion of the stepped axial bore. A sleeve is disposed within the first portion of the stepped axial bore. The sleeve includes a sleeve diameter that is substantially equal to the second diameter of the second portion of the stepped axial bore. The sleeve divides the stepped axial bore to define an outer stepped axial bore cavity and an inner stepped axial bore cavity. The turbine output shaft defines a first turbine shaft radial bore, a second turbine shaft radial bore and a third turbine shaft radial bore. The first turbine shaft radial bore is in fluid communication with the inner stepped axial bore cavity and extends radially outward relative to the central axis. The second turbine shaft radial bore is in fluid communication with the outer stepped axial bore cavity and extends radially outward relative to the central axis. The second turbine shaft radial bore is disposed adjacent a second end of the first portion of the stepped axial bore. The third turbine shaft radial bore is in fluid communication with the outer stepped axial bore cavity and extends radially outward relative to the central axis. The third turbine shaft radial bore is disposed adjacent a first end of the first portion of the stepped axial bore. An isolator assembly is disposed between the turbine and the housing. The isolator assembly is concentric with the central axis. The isolator assembly is coupled to the housing for rotation with the housing about the central axis. The isolator assembly is configured for absorbing torsional input vibrations. The isolator assembly includes a rotational dampening travel distance of at least twenty degrees)(20°) about the central axis. The isolator assembly includes at least two resistance ranges increasing in resistance with an increase in the rotational dampening distance. A lock-up clutch selectively interconnects the turbine and the housing. The lock-up clutch is actuated by a variable hydraulic signal between an engaged position and a disengaged position. When in the engaged position, the lock-up clutch couples the turbine to the housing for rotation with the housing about the central axis. When in the disengaged position, the lock-up clutch decouples the turbine and the housing to allow independent rotation of the turbine relative to the housing. A first fluid flow path includes the outer stepped axial bore cavity, the second turbine shaft radial bore and the third turbine shaft radial bore. The first fluid flow path is configured to supply a fluid to the pump cavity. A second fluid flow path is configured to remove the fluid from the pump cavity. A third fluid flow path includes the inner stepped axial bore cavity and the first turbine shaft radial bore. The third fluid flow path is configured for supplying the variable hydraulic signal to the lock-up clutch to move the lock-up clutch between the engaged position and the disengaged position. The third fluid flow path is independent and distinct from the first fluid flow path and the second fluid flow path. The first fluid flow path and the second fluid flow path combine to define a continuous fluid flow circuit for conveying the fluid along a non-reversible path when the lock-up clutch is in either the engaged position or the disengaged position.

Accordingly, the torque converter defines a separate and distinct third fluid flow path to supply the variable hydraulic signal to the lock-up clutch, thereby allowing the first fluid flow path and the second fluid flow path to be dedicated to supplying and removing a fluid, i.e., a hydraulic oil, to and from the torque converter.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic fragmentary cross sectional view of an automatic transmission including the torque converter.

FIG. 2 is an exploded perspective view of an isolator assembly of the torque converter.

DETAILED DESCRIPTION

Referring to the Figures, wherein like numerals indicate like parts throughout the several views, a torque converter is shown generally at 20. The torque converter 20 is for an automatic transmission, which is shown generally at 22 in FIG. 1.

Referring to FIG. 1, the torque converter 20 includes a housing 24. The housing 24 is fixedly attached to a flexplate (not shown), also referred to as a flywheel. The flexplate is connected to an engine output member (not shown) of a vehicle, such as a crankshaft or the like. The flexplate transmits rotational torque from the engine to the torque converter 20. The housing 24 is rotatable about and concentric with a central axis 26. As such, the housing 24 and the flexplate rotate about the central axis 26 with the output member of the engine. The housing 24 further includes a hub 28, which rotatably supports the housing 24 relative to the transmission 22.

The torque converter 20 includes a pump 30 that is attached to or integrally formed with the housing 24. The pump 30 rotates with the housing 24 about the central axis 26. The pump 30 includes a plurality of vanes disposed within an interior of the housing 24. The vanes are radially spaced about the central axis 26, and extend radially outward away from the central axis 26.

The torque converter 20 includes a turbine 32 that is concentric with and opposes the pump 30. The turbine 32 opposes the pump 30 to define a pump cavity 34 between the turbine 32 and the pump 30. The turbine 32 is rotatable about the central axis 26. The turbine 32 includes a plurality of vanes disposed within an interior of the housing 24. The vanes of the turbine 32 oppose the vanes of the pump 30. The vanes of the turbine 32 are radially spaced about the central axis 26, and extend radially outward from the central axis 26.

The torque converter 20 includes a fluid, such as but not limited to a transmission fluid or hydraulic oil, that circulates through the torque converter 20. The vanes of the pump 30 force the fluid against the vanes of the turbine 32, which causes the turbine 32 to rotate, thereby transferring the power from the pump 30 to the turbine 32.

The torque converter 20 may further include a stator 36, which operates as known to those skilled in the art. The stator 36 includes a stator output shaft 38, which extends longitudinally along the central axis 26, away from the flexplate. The stator output shaft 38 includes a hollow central portion 40 that is supported by the housing 24, and defines a first stator shaft radial bore 42 and a second stator shaft radial bore 44. The first stator shaft radial bore 42 and the second stator shaft radial bore 44 extend radially outward from the central axis 26. An outer surface of the stator output shaft 38 cooperates with an interior surface of the hub 28 of the torque converter 20 to define a first annular cavity 46 therebetween.

The turbine 32 includes a turbine output shaft 48. The turbine output shaft 48 is at least partially disposed within the hollow central portion 40 of the stator output shaft 38. The turbine output shaft 48 extends from the turbine 32, longitudinally along the central axis 26 and away from the flexplate. The turbine output shaft 48 and the stator output shaft 38 cooperate to define a second annular cavity 50 between an outer surface of the turbine output shaft 48 and an interior surface of the hollow central portion 40 of the stator output shaft 38.

A lock-up clutch 52 selectively interconnects the turbine 32 and the housing 24. The lock-up clutch 52 is actuated by a variable hydraulic signal to move between an engaged position and a disengaged position. The variable hydraulic signal includes a fluid pressure, which actuates the lock-up clutch 52. When the lock-up clutch 52 is in the engaged position, the lock-up clutch 52 couples the turbine 32 to the housing 24 for rotation with the housing 24 about the central axis 26, thereby eliminating slip between the turbine 32 and the pump 30, which increases the efficiency of the torque converter 20. When the lock-up clutch 52 is in the disengaged position, the lock-up clutch 52 decouples the turbine 32 and the housing 24 to allow independent rotation of the turbine 32 relative to the housing 24, thereby allowing slippage between the turbine 32 and the pump 30.

The torque converter 20 includes a piston 54, which is disposed between the housing 24 and the lock-up clutch 52. The piston 54 and the housing 24 define a piston apply chamber 56 therebetween. An increase in fluid pressure of the variable hydraulic signal within the piston apply chamber 56 moves the piston 54 toward the lock-up clutch 52, which increases a compressive force on the lock-up clutch 52, causing the lock-up clutch 52 to engage. A decrease in fluid pressure of the variable hydraulic signal within the piston apply chamber 56 allows the piston 54 to move away from the lock-up clutch 52, which decreases the compressive force on the lock-up clutch 52, causing the lock-up clutch 52 to disengage. The fluid pressure of the variable hydraulic signal applies a force to the piston 54, which thereby applies a force to the lock-up clutch 52. The magnitude of the force applied to the lock-up clutch 52 is directly proportional to a magnitude of the fluid pressure of the variable hydraulic signal.

The turbine output shaft 48 defines a stepped axial bore 58. The stepped axial bore 58 extends from and is open at a first axial end 60 of the turbine output shaft 48. The stepped axial bore 58 is a dead bore that extends into the turbine output shaft 48. The stepped axial bore 58 includes a first portion 62 and a second portion 64. The first portion 62 and the second portion 64 of the stepped axial bore 58 are concentric with each other and concentric with the central axis 26. The first portion 62 of the stepped axial bore 58 is disposed adjacent the first axial end 60 of the turbine output shaft 48, with the second portion 64 of the stepped axial bore 58 disposed adjacent the first portion 62 and spaced from the first axial end 60 of the turbine output shaft 48 along the central axis 26. The first portion 62 of the stepped axial bore 58 includes a first diameter 66, and the second portion 64 of the stepped axial bore 58 includes a second diameter 68. The second diameter 68 of the second portion 64 of the stepped axial bore 58 is smaller than the first diameter 66 of the first portion 62 of the stepped axial bore 58. Accordingly, the diameter of the stepped axial bore 58 is larger at the first portion 62, which is nearer the first axial end 60 of the turbine output shaft 48, than at the second portion 64, which is farther from the first axial end 60 of the turbine output shaft 48.

The first portion 62 of the stepped axial bore 58 includes a first end 70 and a second end 72. The second end 72 of the first portion 62 is spaced opposite from the first end 70 along the central axis 26. Accordingly, the second end 72 of the first portion 62 is spaced at an opposite axial end of the first portion 62 from the first end 70 of the first portion 62. The second end 72 of the first portion 62 is disposed adjacent the second portion 64 of the stepped axial bore 58.

A sleeve 74 is disposed within the first portion 62 of the stepped axial bore 58. The sleeve 74 may include a diameter that is substantially equal to the second diameter 68 of the second portion 64 of the stepped axial bore 58. However, it should be appreciated that the sleeve 74 diameter may differ from the second diameter 68. The sleeve 74 is in sealing engagement against the stepped axial bore 58 at the first end 70 and the second end 72 of the first portion 62 of the stepped axial bore 58. The sleeve 74 divides the stepped axial bore 58 to define an outer stepped axial bore cavity 76 and an inner stepped axial bore cavity 78. The inner stepped axial bore cavity 78 is in fluid communication with a central nose portion 80 of the housing 24. The central nose portion 80 is disposed adjacent the flexplate and is concentric with the central axis 26. The central nose portion 80 of the housing 24 is in fluid communication with the piston apply chamber 56.

The turbine output shaft 48 defines a first turbine shaft radial bore 82, a second turbine shaft radial bore 84 and a third turbine shaft radial bore 86. The first turbine shaft radial bore 82 is in fluid communication with the inner stepped axial bore cavity 78, and extends radially outward relative to the central axis 26. The second turbine shaft radial bore 84 is in fluid communication with the outer stepped axial bore cavity 76, and extends radially outward relative to the central axis 26. The second turbine shaft radial bore 84 is disposed adjacent the second end 72 of the first portion 62 of the stepped axial bore 58. The third turbine shaft radial bore 86 is in fluid communication with the outer stepped axial bore cavity 76, and extends radially outward relative to the central axis 26. The third turbine shaft radial bore 86 is disposed adjacent the first end 70 of the first portion 62 of the stepped axial bore 58.

The torque converter 20 includes a first fluid flow path 88, a second fluid flow path 90 and a third fluid flow path 92. The first fluid flow path 88 is configured to supply a fluid to the pump cavity 34. The second fluid flow path 90 is configured to remove the fluid from the pump cavity 34. The first fluid flow path 88 and the second fluid flow path 90 combine to define a continuous fluid flow circuit for conveying the fluid along a non-reversible path when the lock-up clutch 52 is in either the engaged position or the disengaged position. Accordingly, whether the lock-up clutch 52 is in either the engaged position or the disengaged position, fluid to the pump cavity 34 flows to the pump cavity 34 through the first fluid flow path 88, and exits the pump cavity 34 through the second fluid flow path 90. The third fluid flow path 92 is configured to supply the variable hydraulic signal to the lock-up clutch 52 to move the lock-up clutch 52 between the engaged position and the disengaged position. The third fluid flow path 92 is independent and distinct from the first fluid flow path 88 and the second fluid flow path 90. Accordingly, application of the variable hydraulic signal to the piston apply chamber 56 does not affect fluid flow to or from the pump cavity 34 of the torque converter 20.

The first fluid flow path 88 includes the first stator shaft radial bore 42, the second annular cavity 50, the second turbine shaft radial bore 84, the outer stepped axial bore cavity 76, the third turbine shaft radial bore 86, and the pump cavity 34. Fluid to operate the torque converter 20 is supplied to the first stator shaft radial bore 42. The first stator shaft radial bore 42 is in fluid communication with the second annular cavity 50 such that the fluid flows from the first stator shaft radial bore 42 into the second annular cavity 50. The second annular cavity 50 is in fluid communication with the second turbine shaft radial bore 84 such that the fluid flows from the second annular cavity 50 into the second turbine shaft radial bore 84. The second turbine shaft radial bore 84 is in fluid communication with the outer stepped axial bore cavity 76 such that the fluid flows from the second turbine shaft radial bore 84 into the outer stepped axial bore cavity 76. The outer stepped axial bore cavity 76 is in fluid communication with the third turbine shaft radial bore 86 such that the fluid flows from the outer stepped axial bore cavity 76 into the third turbine shaft radial bore 86. The third turbine shaft radial bore 86 is in fluid communication with the pump cavity 34 such that the fluid flows from the third turbine shaft radial bore 86 into the pump cavity 34.

The second fluid flow path 90 includes the pump cavity 34 and the first annular cavity 46. The pump cavity 34 is in fluid communication with the first annular cavity 46 such that the fluid flows from the pump cavity 34 into the first annular cavity 46. The fluid flows from the pump cavity 34 to the first annular cavity 46 through a plurality of splines 94 in the stator output shaft 38 and/or radially inward through one or more stator 36 thrust needle bearings 96. The fluid exits the first annular cavity 46 and typically flows through a heat exchanger (not shown) and back to other components of the transmission 22.

The third fluid flow path 92 includes the second stator shaft radial bore 44, the first turbine shaft radial bore 82, the second portion 64 of the stepped axial bore 58, the inner stepped axial bore cavity 78, the central nose portion 80 of the housing 24 and the piston apply chamber 56. Fluid is supplied to the third fluid flow path 92 through the second stator shaft radial bore 44. The second stator shaft radial bore 44 is in fluid communication with the first turbine shaft radial bore 82 such that fluid flows between the second stator shaft radial bore 44 and the first turbine shaft radial bore 82. The first turbine shaft radial bore 82 is in fluid communication with the second portion 64 of the stepped axial bore 58 such that fluid flows between the first turbine shaft radial bore 82 and the second portion 64 of the stepped axial bore 58. The second portion 64 of the stepped axial bore 58 is in fluid communication with the inner stepped axial bore cavity 78 such that fluid flows between the second portion 64 of the stepped axial bore 58 and the inner stepped axial bore cavity 78. The inner stepped axial bore cavity 78 is in fluid communication with the central nose portion 80 of the housing 24 such that fluid flows between the inner stepped axial bore cavity 78 and the central nose portion 80 of the housing 24. The central nose portion 80 of the housing 24 is in fluid communication with the piston apply chamber 56 such that fluid flows between the central nose portion 80 of the housing 24 and the piston apply chamber 56.

The torque converter 20 may further include an isolator assembly 98. The isolator assembly 98 is disposed between the turbine 32 and the housing 24. The isolator assembly 98 is concentric with the central axis 26, and is coupled to the housing 24 for rotation with the housing 24 about the central axis 26. The isolator assembly 98 is configured for absorbing torsional input vibrations.

Referring to FIG. 2, the isolator assembly 98 includes a first cover 100 and a second cover 102. The first cover 100 and the second cover 102 are mechanically jointed together with fasteners (not shown) or by other methods familiar to those skilled in the art. The second cover 102 is concentric with the first cover 100 about the central axis 26. A damper support plate 104 is disposed between and supports the first cover 100 and the second cover 102. A plurality of spring assemblies 106 is supported by the damper support plate 104. Each of the plurality of spring assemblies 106 is radially spaced about the central axis 26, and is spaced equidistant from the central axis 26. The spring assemblies 106 couple the first cover 100 and the second cover 102 together relative to the damper support plate 104. The first cover 100 and the second cover 102 are rotatable about the central axis 26 relative to the damper support plate 104 a rotational dampening travel distance. Accordingly, the first cover 100 and the second cover 102 may move relative to the damper support plate 104 an angular distance equal to the rotational dampening travel distance. The rotational dampening travel distance is equal to at least twenty degrees)(20°) about the central axis 26. The first cover 100 and the second 102 cover move relative to the damper support plate 104 to compress the spring assemblies 106, and thereby absorb torsional vibrations transmitted from the engine.

Preferably, each of the plurality of spring assemblies 106 includes at least two levels of resistance. However, it should be appreciated that the spring assemblies 106 may only include one level of resistance. The levels of resistance of the spring assemblies 106 increase in rotational resistance, i.e., resistance against rotation, with an increase in the rotational dampening travel distance. Accordingly, the resistance to rotation provided by the spring assemblies 106 increases as the angular movement of the first cover 100 and the second cover 102 relative to the damper support plate 104 increases. As such, higher values of the rotational dampening travel distance provide a higher level of resistance, i.e., a stiffer resistance.

The different levels of resistance in the spring assemblies 106 are determined by the number of different springs in each spring assembly 106. Each of the plurality of spring assemblies 106 include at least a first spring 108, which defines a first level of resistance. The spring assemblies 106 may further include a second spring 110 and a third spring 112, with the second spring 110 defining a second level of resistance and the third spring 112 defining a third level of resistance. If the spring assemblies 106 include the first spring 108 and the second spring 110, then the first spring 108 and the second spring 110 may be arranged and operate either in parallel with each other or in series with each other. If the spring assemblies 106 include the first spring 108, the second spring 110 and the third spring 112, then the first spring 108, the second spring 110 and the third spring 112 may be arranged and operate either in parallel with each other, in series with each other or as shown in FIG. 2, the second spring 110 and the third spring 112 may be arranged and operate in series with each other, with the combination of the second spring 110 and the third spring 112 operating in parallel with the first spring 108. A spacer 114 may be disposed between the second spring 110 and the third spring 112 to align and join the second spring 110 and the third spring 112.

While the best modes for carrying out the invention have been described in detail, those familiar with the art to which this invention relates will recognize various alternative designs and embodiments for practicing the invention within the scope of the appended claims.

The invention claimed is:

1. A torque converter for an automatic transmission, the torque converter comprising:
   a housing rotatable about and concentric with a central axis;
   a pump attached to the housing for rotation with the housing about the central axis;
   a turbine concentric with and opposing the pump to define a pump cavity between the turbine and the pump, and rotatable about the central axis, wherein the turbine includes a turbine output shaft defining a stepped axial bore having a first portion at a first diameter and a second portion at a second diameter;

a sleeve disposed within the first portion of the stepped axial bore and axially dividing the first portion of the stepped axial bore to define an outer stepped axial bore cavity and an inner stepped axial bore cavity;

wherein the turbine output shaft defines a first turbine shaft radial bore in fluid communication with the inner stepped axial bore cavity and extending radially outward relative to the central axis;

wherein the turbine output shaft defines a second turbine shaft radial bore and a third turbine shaft radial bore each in fluid communication with the outer stepped axial bore cavity and extending radially outward relative to the central axis, with the second turbine shaft radial bore disposed adjacent a second end of the first portion of the stepped axial bore and the third turbine shaft radial bore is disposed adjacent a first end of the first portion of the stepped axial bore;

a lock-up clutch selectively interconnecting the turbine and the housing and actuated by a variable hydraulic signal between an engaged position and a disengaged position, wherein the lock-up clutch couples the turbine to the housing for rotation with the housing about the central axis when in the engaged position, and wherein the lock-up clutch decouples the turbine and the housing to allow independent rotation of the turbine relative to the housing when in the disengaged position;

a first fluid flow path including the outer stepped axial bore cavity and configured to supply a fluid to the pump cavity;

a second fluid flow path configured to remove the fluid from the pump cavity; and a third fluid flow path independent and distinct from the first fluid flow path and the second fluid flow path and configured to supply the variable hydraulic signal to the lock-up clutch to move the lock-up clutch between the engaged position and the disengaged position, wherein the third fluid flow path includes the inner stepped axial bore cavity.

2. A torque converter as set forth in claim 1 wherein the second diameter of the second portion of the stepped axial bore is smaller than the first diameter of the first portion of the stepped axial bore.

3. A torque converter as set forth in claim 2 wherein the first portion and the second portion of the stepped axial bore are concentric with each other and concentric with the central axis.

4. A torque converter as set forth in claim 1 wherein the first portion of the stepped axial bore includes a first end and a second end spaced at opposite axial ends of the first portion, with the sleeve sealing against the stepped axial bore at the first end and the second end of the first portion of the stepped axial bore.

5. A torque converter as set forth in claim 1 further comprising a piston disposed between the housing and the lock-up clutch, wherein the piston and the housing define a piston apply chamber therebetween.

6. A torque converter as set forth in claim 5 wherein a the inner stepped axial bore cavity is in fluid communication with a central nose portion of the housing.

7. A torque converter as set forth in claim 6 wherein the central nose portion of the housing is in fluid communication with the piston apply chamber.

8. A torque converter as set forth in claim 1 further comprising an isolator assembly disposed between the turbine and the housing and concentric with the central axis, wherein the isolator assembly includes a rotational dampening travel distance of at least twenty degrees (20°) about the central axis.

9. A torque converter as set forth in claim 8 wherein the isolator assembly includes a plurality of spring assemblies disposed radially about and equidistant from the central axis, with each of the plurality of spring assemblies including at least two levels of resistance.

10. A torque converter as set forth in claim 9 wherein the at least two levels of resistance of the spring assemblies increase in rotational resistance with an increase in the rotational dampening travel distance.

11. A torque converter as set forth in claim 10 wherein each of the plurality of spring assemblies include at least a first spring and a second spring.

12. A torque converter as set forth in claim 11 wherein the first spring and the second spring operate in parallel with each other.

13. A torque converter as set forth in claim 11 wherein each of the spring assemblies includes a third spring, with the second spring and the third spring operating in series with each other, and the combination of the second spring and the third spring operating in parallel with the first spring.

14. A torque converter for an automatic transmission, the torque converter comprising:

a housing rotatable about and concentric with a central axis;

a pump attached to the housing for rotation with the housing about the central axis;

a turbine concentric with and opposing the pump to define a pump cavity between the turbine and the pump, and rotatable about the central axis;

wherein the turbine includes a turbine output shaft defining a stepped axial bore having a first portion at a first diameter and a second portion at a second diameter and concentric with the first portion, wherein the second diameter of the second portion of the stepped axial bore is smaller than the first diameter of the first portion of the stepped axial bore;

a sleeve disposed within the first portion of the stepped axial bore and axially dividing the stepped axial bore to define an outer stepped axial bore cavity and an inner stepped axial bore cavity;

wherein the turbine output shaft defines a first turbine shaft radial bore in fluid communication with the inner stepped axial bore cavity and extending radially outward relative to the central axis, a second turbine shaft radial bore in fluid communication with the outer stepped axial bore cavity and extending radially outward relative to the central axis and disposed adjacent a second end of the first portion of the stepped axial bore, and a third turbine shaft radial bore in fluid communication with the outer stepped axial bore cavity and extending radially outward relative to the central axis and disposed adjacent a first end of the first portion of the stepped axial bore;

an isolator assembly disposed between the turbine and the housing and concentric with the central axis, wherein the isolator assembly is coupled to the housing for rotation with the housing about the central axis and configured for absorbing torsional input vibrations, and wherein the isolator assembly includes a rotational dampening travel distance of at least twenty degrees (20°) about the central axis and includes at least two resistance ranges increasing in resistance with an increase in the rotational dampening distance;

a lock-up clutch selectively interconnecting the turbine and the housing and actuated by a variable hydraulic signal between an engaged position and a disengaged position, wherein the lock-up clutch couples the turbine to the housing for rotation with the housing about the central axis when in the engaged position, and wherein the lock-up clutch decouples the turbine and the housing to allow independent rotation of the turbine relative to the housing when in the disengaged position;

a first fluid flow path including the outer stepped axial bore cavity, the second turbine shaft radial bore and the third turbine shaft radial bore, wherein the first fluid flow path is configured to supply a fluid to the pump cavity;

a second fluid flow path configured to remove the fluid from the pump cavity; and a third fluid flow path including the inner stepped axial bore cavity and the first turbine shaft radial bore, wherein the third fluid flow path is independent and distinct from the first fluid flow path and the second fluid flow path and configured for supplying the variable hydraulic signal to the lock-up clutch to move the lock-up clutch between the engaged position and the disengaged position;

wherein the first fluid flow path and the second fluid flow path combine to define a continuous fluid flow circuit for conveying the fluid along a non-reversible path when the lock-up clutch is in either the engaged position or the disengaged position.

* * * * *